United States Patent
Bedekar et al.

(10) Patent No.: US 10,200,883 B2
(45) Date of Patent: Feb. 5, 2019

(54) RADIO ACCESS NETWORK (RAN) TRANSPORT EVOLVED PACKET CORE (EPC) SYNERGY

(71) Applicant: NOKIA SOLUTIONS AND NETWORKS OY, Espoo (FI)

(72) Inventors: Anand Bedekar, Glenview, IL (US); Nurit Sprecher, St. Petach Tikva (IL); Nir Zinger, Moshav Burgata (IL); Joao Gustavo Gomes, Mountain View, CA (US); Thomas Gemmer, München (DE); Meir Cohen, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/912,729

(22) PCT Filed: Aug. 19, 2013

(86) PCT No.: PCT/US2013/055582
§ 371 (c)(1),
(2) Date: Feb. 18, 2016

(87) PCT Pub. No.: WO2015/026315
PCT Pub. Date: Feb. 26, 2015

(65) Prior Publication Data
US 2016/0205570 A1    Jul. 14, 2016

(51) Int. Cl.
*H04W 24/08* (2009.01)
*H04W 24/02* (2009.01)

(52) U.S. Cl.
CPC ............ *H04W 24/02* (2013.01); *H04W 24/08* (2013.01)

(58) Field of Classification Search
CPC ........ H04L 24/02; H04L 24/08; H04W 24/02; H04W 24/08
See application file for complete search history.

(56) References Cited

U.S. PATENT DOCUMENTS 7,843,938 B1    11/2010    Sutter et al.
9,473,986 B2 *  10/2016    Tomici .................. H04L 45/123
(Continued)

FOREIGN PATENT DOCUMENTS

| CN | 101507333 A | 8/2009 |
| CN | 103067428 A | 4/2013 |

(Continued)

OTHER PUBLICATIONS

International Search Report and Written Opinion dated Nov. 15, 2013, issued in corresponding International Application No. PCT/US2013/055582.
(Continued)

*Primary Examiner* — Gbemileke J Onamuti
(74) *Attorney, Agent, or Firm* — Squire Patton Boggs (US) LLP (57) ABSTRACT

Systems, methods, apparatuses, and computer program products for signaling support that define an open and extensible end-to-end network architecture. One method includes extracting, by an interface to a base station system, real-time and context related information from a radio access network, and transmitting the extracted real-time and context related information to an interface to a transport system.

18 Claims, 7 Drawing Sheets

(56) References Cited

U.S. PATENT DOCUMENTS

| | | |
|---|---|---|
| 2003/0172160 A9 | 9/2003 | Widegren et al. |
| 2005/0026616 A1 | 2/2005 | Cavalli et al. |
| 2007/0115899 A1* | 5/2007 | Ovadia ................ H04W 36/24 370/338 |
| 2009/0029645 A1 | 1/2009 | Leroudier |
| 2009/0141674 A1 | 6/2009 | Masuda et al. |
| 2010/0075692 A1 | 3/2010 | Busschbach et al. |
| 2010/0159945 A1* | 6/2010 | Brisebois ................ H04W 4/02 455/456.1 |
| 2011/0267943 A1 | 11/2011 | Huang et al. |
| 2011/0268007 A1 | 11/2011 | Barnay et al. |
| 2012/0155298 A1 | 6/2012 | Yang et al. |
| 2014/0126358 A1 | 5/2014 | Bedekar et al. |

FOREIGN PATENT DOCUMENTS

| | | |
|---|---|---|
| CN | 103202052 A | 7/2013 |
| EP | 2770800 A1 | 8/2014 |

OTHER PUBLICATIONS

International Preliminary Report on Patentability dated May 20, 2015, issued in corresponding International Application No. PCT/US2013/055582.
European Search Report application No. 13892050.9 dated Dec. 20, 2016.
Communication pursuant to Article 94(3) EPC dated Nov. 6, 2017 corresponding to European Patent Application No. 13892050.9.
Chinese Office Action dated Jul. 26, 2018, issued in corresponding CN Application No. 201380080342.2.

* cited by examiner

RADIO ACCESS NETWORK (RAN) TRANSPORT EVOLVED PACKET CORE (EPC) SYNERGY

BACKGROUND

Field

Embodiments of the invention generally relate to mobile communications networks, such as, but not limited to, Long Term Evolution (LTE) or LTE-Advanced (LTE-A), which are made up of interconnected Radio Access Networks (RAN), Transport networks (backhaul and backbone networks) and Evolved Packet Core (EPC).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the evolved Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and multimedia transport in addition to high-capacity voice support. Advantages of LTE include, for example, high throughput, low latency, FDD and TDD support in the same platform, an improved end-user experience, and a simple architecture resulting in low operating costs.

Further releases of 3GPP LTE (e.g., LTE Rel-11, LTE Rel-12) are targeted towards future international mobile telecommunications advanced (IMT-A) systems, referred to herein for convenience simply as LTE-Advanced (LTE-A).

LTE-A is directed toward extending and optimizing the 3 GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a method including extracting, by an interface to a base station system, real-time and context related information from a radio access network. The method also includes transmitting the extracted real-time and context related information to an interface to a transport system.

Another embodiment is directed to an apparatus at least one processor, at least one memory comprising computer program code, and an interface to a base station system. The at least one memory and the computer program code are configured, with the at least one processor, to cause the interface to the base station system at least to extract real-time and context related information from a radio access network and transmit the extracted real-time and context related information to an interface to a transport system.

Another embodiment is directed to a computer program embodied on a computer readable medium. The computer program is configured to control a processor to perform a process including extracting, by an interface to a base station system, real-time and context related information from a radio access network. The process also includes transmitting the extracted real-time and context related information to an interface to a transport system.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products that define an open and extensible end-to-end network architecture, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the invention relate to 4G Mobile Broadband (MBB) networks, which are made up of interconnected Radio Access Network (RAN), Transport networks (backhaul and backbone networks) and Evolved Packet Core (EPC). Embodiments define an open and extensible end-to-end network architecture and framework in which network applications that reside on top of the RAN, EPC and Transport networks can operate in a harmonized and coordinated way to create synergy and provide value-added services.

It is expected that by the year 2020 the 4G MBB network will need to provide ultra-high broadband under practical load conditions of a thousand times larger capacity and a ten times faster rate of transmission. Future networks will have to cope with thousands of different services and applications that are rich in media, sensitive to quality and delay, extremely bandwidth (BW) hungry, and can be requested anytime and anywhere. The flow of demand is increasingly unpredictable. All users, human as well as machine, will expect the optimal experience from the network for their personalized set of applications (e.g., one gigabyte of personal data per user per day). The network must respond to liquid demand, react dynamically to the evolution of user needs and available resources, and adapt to changing network conditions.

Technology evolutions in radio and transport will allow coping with future application requirements and will improve customer experience. New capabilities and advances in LTE, such as control and management mechanisms, coordinated small cell deployments and heterogeneous broadband access architecture will enable mobile networks to adapt instantaneously to changing customer needs. For example, these new capabilities and advances in LTE will enable mobile networks to improve the capacity, speed and coverage, perform differentiation at the user and the application levels, adapt instantaneously to changing customer needs, and ensure fairness. The radio network (RAN and EPC) is very dynamic and constantly adapts to actual state, changing network conditions and usage.

Application and user differentiation will underlie the efficient utilization of network resources while guaranteeing the best customer experience. Transport is a critical component that connects the RAN and the mobile core networks, and its performance affects the overall performance of the radio network, and the user experience. The transport network will need to efficiently and intelligently support the traffic growth and agile network and usage conditions while satisfying the demanding performance objectives driven by the evolution to 4G.

Quality of Experience (QoE) is a subjective measure of a user's experiences with a service and is designed as a network-wide parameter, taking a holistic approach to efficiency, agility and experience.

The Transport network is an important component for provisioning end-to-end QoS. Its behavior today is defined statically based on offline network planning. Such network planning is based on statistical assumptions on the distribution of the users and their usage of services. In some cases, a severe mismatch between planned and real behavior can adversely affect the user experience. This may be critical for latency-sensitive services.

In 4G MBB networks there is currently no mechanism which allows the radio and the transport networks to operate in a harmonious and coordinated way and be managed using a holistic end-to-end view. A problem which results from the lack of such coordination between the radio and the transport network includes un-harmonized bandwidth allocation between the radio and the transport networks. In this case, bronze users perceive bad service quality because of fixed allocation of scheduler-weights of the Transport Network Elements (NEs) (which does not consider actual usage, actual number of users and sessions per traffic class and per eNB, etc.) and lack of interaction between the radio and the transport networks. Interaction between the RAN and the transport networks can make the transport RAN-aware and context-aware, allowing it to adapt to changing network and usage conditions, control congestion and avoid bottlenecks, adjust the scheduler-weights dynamically, and ensure fairness while controlling heavy users.

The radio network holds an immense amount of real-time and context-related information that could be exploited to optimize the transport network behavior and the user experience. Real-time and context-related information, such as cell utilization, number of users per QoS class identifier (QCI), bandwidth (BW) demand per sector and per QCI, actual location in the cell, speed of user in motion, application and context used, and/or predicted rate per application, can help to provide value-added services, optimize the transport network and provide better user experience. Such information can help to design consistent end-to-end differentiated QoS, to optimally utilize the network resources, control and avoid congestion by adapting to the real-time information and adjusting the configuration of the weights, queues and shapers, increase goodput and reduce loss rate, ensure fair usage (also when network sharing is used), provide service-specific treatment, etc.

For example, information from the RAN on the number of sessions per eNB QCI can be used by the transport network element to dynamically adjust the scheduler-weights per eNB and ensure fair bandwidth distribution. QCI shows which flows/bearers (between the UE and the EPC) should be given priority in the presence of congestion and can be used to prioritize classes of traffic that need low latency and de-prioritize traffic which do not. The transport network element can use hierarchical shaping between traffic flows per eNB and between eNBs with full alignment with the radio network, ensuring fairness even when heavy users utilize large amounts of the available bandwidth and increase goodput and avoid re-transmission. The information can also be used by the transport network to ensure green mobile backhaul and cost efficiency by reducing total power consumption without compromising the QoE. Based on information from the radio network, the transport network can, for example, power-off links during periods of low traffic, etc.

Interaction between the RAN and the transport network can help optimize the overall end-to-end MBB network by better information exchange between the different radio and transport worlds. Such interaction can also make the RAN and the applications on top of it transport-aware and allow them to adjust, adapt, and make intelligent decisions, while also considering observed changing conditions and actual state of the transport network. Real-time information such as real-time measurements of the transport network key performance indicators (KPIs), information on the transport network load, information on resource utilization in the transport network per QCI and per eNB, reporting of faults and degradation events, network topology map and related costs, and/or network availability, etc. can help to provide value-added services and enhance the user experience. Such information can help the RAN make better Wi-Fi (Wireless Fidelity) offloading and load-balancing (based on the transport load and usage) decisions, allow the eNB transfer congestion information, including that of the transport network, to the UEs, etc.

Applications can also use the information from the network to provide better user experience. For example, the location of and the paths between mobile cloud applications can be optimized best according to information on the transport network load. Real-time measurements of service quality, instant correction and continuous optimizations can be improved using the information on the transport network load, availability, faults and degradation.

The EPC's Policy and Charging Rules Function (PCRF), for example, creates rules and sets policy decisions for each active user. It implements a fine-grained, per-subscriber policy by utilizing the RAN KPIs to create a predictive cell-congestion model which is used in the subscriber policy. User experience could be enhanced if the transport network KPIs, such as congestion and utilization per QCI and per eNB, are also considered. In such a case, for example, when the utilization of a particular Class of Service (CoS) reaches a threshold, the transport network can notify the PCRF entity regarding the congestion event. This notification contains information on the affected cells. The PCRF can use the information to adapt subscribers' prioritization and guarantee that users receive the QoE they purchased. When the network is not congested, the PCRF can enlarge the priority of all users as this will not affect premium services and subscribers.

As mentioned above, some embodiments of the present invention define an end-to-end network architecture (from the cell site over the transport network to the core gateways) that is aware of its state and usage, operates in a harmonized and coordinated way and is managed using a holistic end-to-end view, ensuring extreme efficiency and superior user experience. This may include the dynamic exchange of information and coordinated decision-making for resource allocation, pre-emption, prioritization, etc. Certain embodiments also consider the requirement for an affordable mobile broadband, and presents techniques that reduce the network total cost of ownership (TCO), make the most of the available resources and assets, enhance scalability and increase agility, and make the network self-aware, self-adapting and intelligent.

The implementation of the architecture and techniques defined by embodiments of invention will enable the provision of value-added end-to-end MBB connectivity services, and will allow adaptation of applications based on observed network conditions. Examples for such innovative services include: consistent end-to-end differentiated QoS (Quality of Service) design to ensure optimized service experience allowing service providers to charge premium rates, intelligent congestion control and avoidance, increased goodput and reduced loss rate, fair usage, fault management correlation, enablement of applications to intelligently utilize the network and greatly improve the user experience, adaptation of users' prioritization based on end-to-end network utilization, enablement of green mobile network based on holistic end-to-end view, optimal localization of mobile cloud applications and optimized path selection for the user traffic flowing between them, etc.

One embodiment provides the following systems and/or functions that may be placed on top of the 4G MBB network and enable them to operate in a harmonious and coordinated way: 1. Interface to the Base-Station System (I2BS), 2. Interface to the Transport System (I2TS), and 3. Interface to the Core System (I2CS).

The Interface to the Base-Station System (I2BS) is an element or application that resides on top of the RAN. It can reside either within the RAN eNB network element, or in a separate physical element which may or may not include additional network applications, or in a network management system. Among other components, the Base-Station System includes the MAC Scheduler (which is responsible for scheduling the cell's radio resources used in the downlink and uplink whilst providing the required QoS for all active radio bearers, constructing, sending, receiving and processing transport blocks which contain a combination of user-plane data from one or more bearers, control plane data and MAC control messages), interfaces to the EPC and the UEs, real-time and context-related information, etc. In one embodiment, the I2BS may be a software-based network application implemented in hardware, for instance.

According to an embodiment, the I2BS can extract information from the eNB and determine the required behavior of the eNB and program the eNB accordingly, using a dedicated interface. The I2BS can also send the calculated information to the UE and to applications on top of the radio network that can adapt and adjust based on that information.

The Interface to the Transport System (I2TS) is an element or application that resides on top of the transport network (backhaul and backbone). It can reside either within a transport NE (router or switch), or in a separate physical element which may or may not include additional network applications, or in a network management system. Among other components, the transport system includes the scheduler and the queues in the transport network elements, real-time information, for example on the load (per QCI, per eNB), and an interface to the forwarding table. In one embodiment, the I2TS may be a software-based network application implemented in hardware, for example. According to an embodiment, the I2TS can extract information from the transport NEs and determine the required behaviour of the transport NE and program the NE accordingly, using a dedicated interface.

The Interface to the Core System (I2CS) is an element or application that resides on top of the EPC. It can reside either within a particular core network entity (e.g., the Serving gateway, the Packet Data Network (PDN) gateway, the Mobility Management Entity (MME) or the Home Subscriber Server (HSS)), in an element that implements the PCRF function, in a separate physical element which may or may not include additional network applications and functions, or in a network management system. In one embodiment, the I2CS may be a software-based network application implemented in hardware, for instance.

According to an embodiment, the I2CS can extract information from one or more of the EPC applications, determine the required behavior of one or more of the EPC applications, and program them accordingly, using a dedicated interface.

An embodiment defines an interface between the I2BS and the I2TS that is used to transmit real-time and context-related information from the I2BS to the I2TS and vice versa. In addition, an embodiment defines an interface between the I2TS and the I2CS which is used to transmit real-time and context-related information from the I2TS to the I2CS and vice versa. Embodiments discussed below present a user datagram protocol (UDP)-based protocol as an example. However, it is noted that any protocol may be used between the systems/applications.

Figure 1:
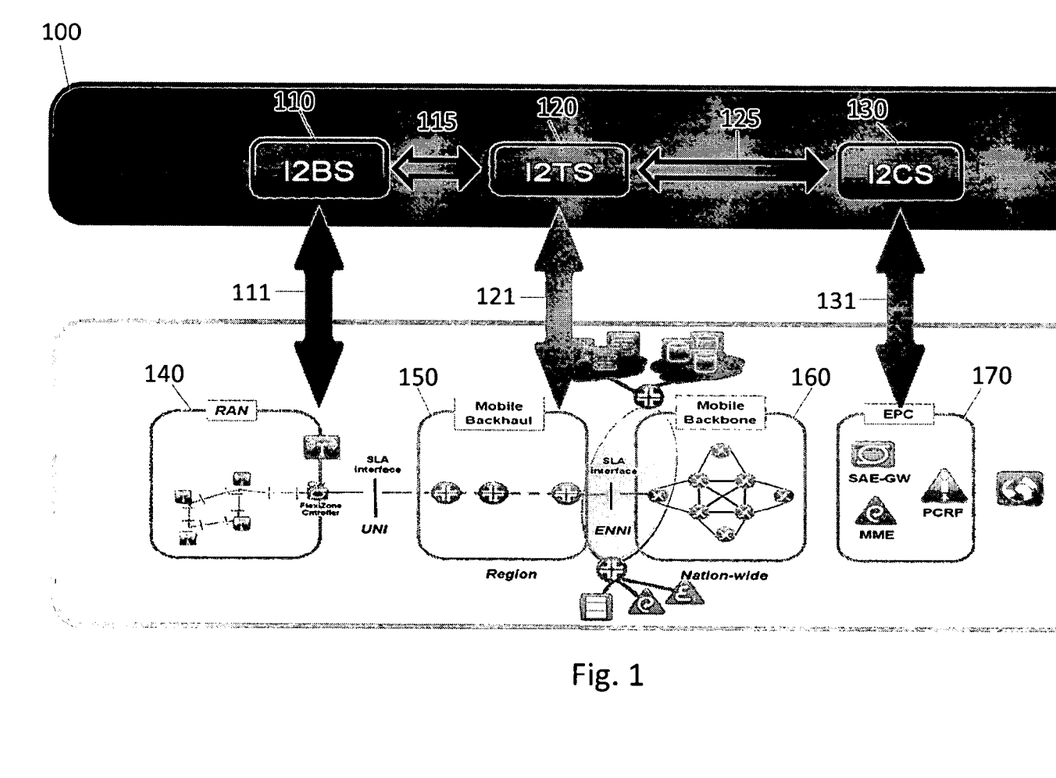
FIG. 1 illustrates a system according to one embodiment.

FIG. 1 illustrates an example of the I2BS 110, I2TS 120 and I2CS 130 network elements, according to one embodiment. In this example, the I2BS 110, I2TS 120 and I2CS 130 reside in a network management system 100. It is noted that this is only one possible example of where the I2BS 110, I2TS 120 and I2CS 130 may reside, as additional possibilities are mentioned above. FIG. 1 also illustrates the interface 115 between the I2BS and the I2TS and the interface 125 between the I2TS 120 and the I2CS 130. FIG. 1 additionally illustrates the interfaces 111, 121, 131 between the I2BS 110, I2TS 120 and I2CS 130, respectively, and the network systems through which they extract information and through which they program the elements with required information. It should be noted that I2BS, I2TS and I2CS can be implemented in software, hardware, or a combination of hardware and software.

Figure 2:
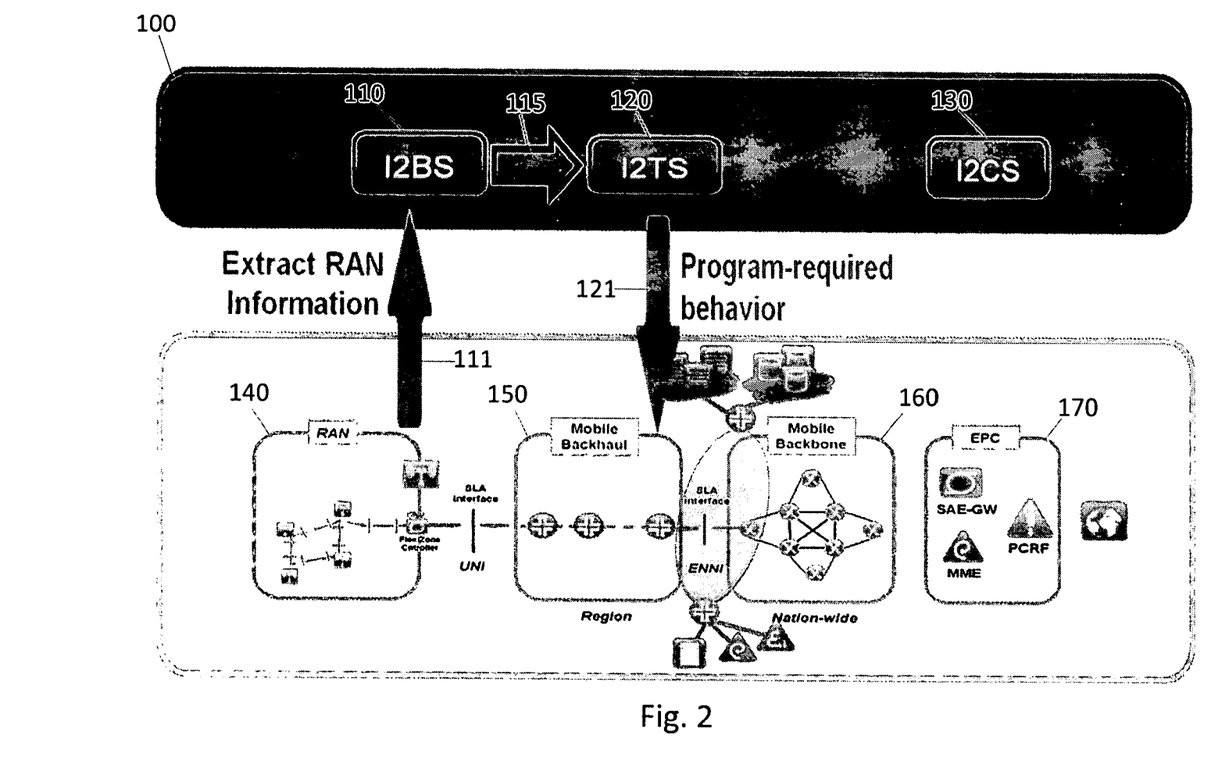
FIG. 2 illustrates a system according to an embodiment.

FIG. 2 illustrates an example in which real-time and context-related information may be extracted by the I2BS 110 from the Base Station System 140 via dedicated interface 111, according to an embodiment. In this embodiment, the information extracted by the I2BS 110 may be transmitted to the I2TS 120, which determines the required behavior of the transport system, and programs it accordingly using dedicated interface 121.

Figure 3:
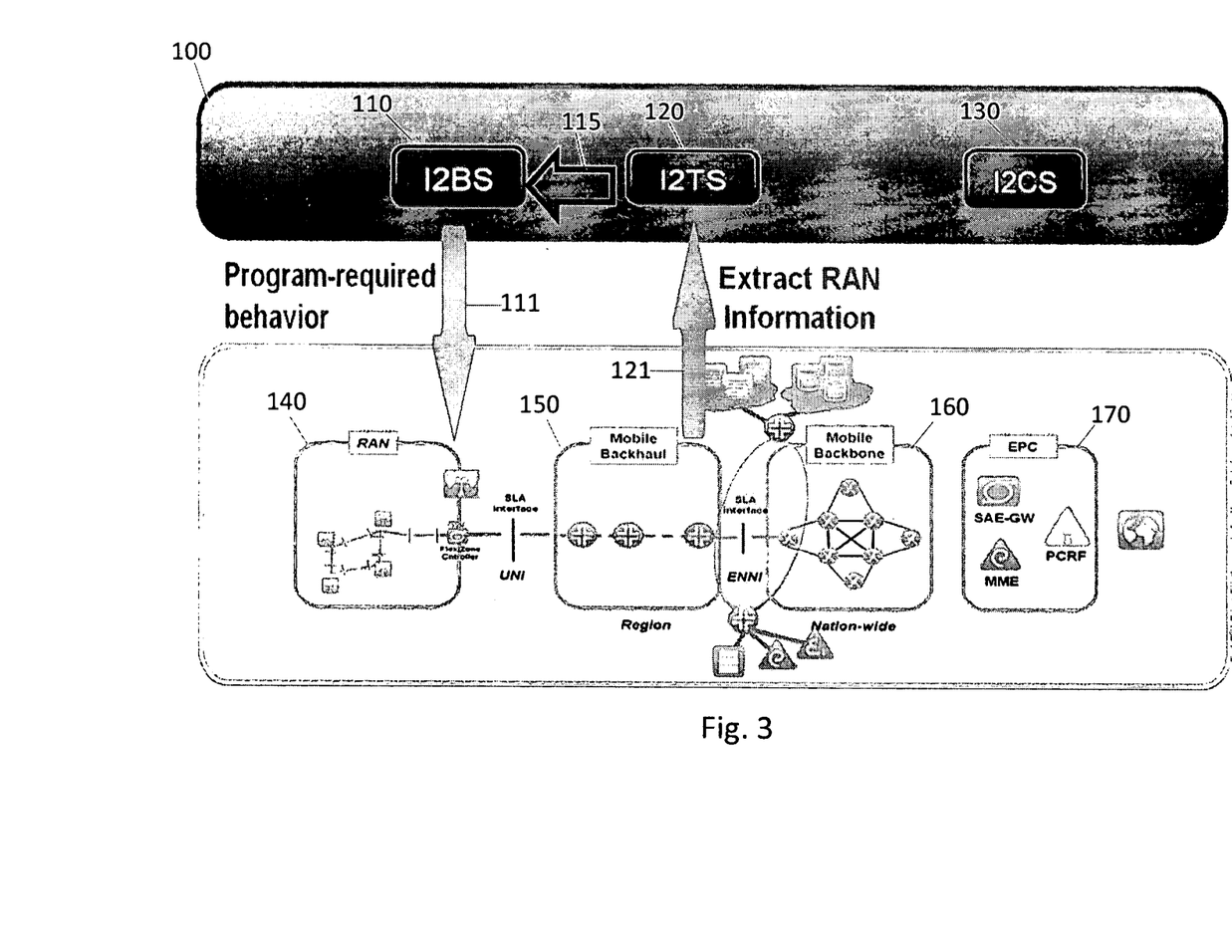
FIG. 3 illustrates a system according to an embodiment.

FIG. 3 illustrates an example in which real-time and context-related information may be extracted by the I2TS 120 from the transport system 150, 160 via dedicated interface 121. The extracted information may be transmitted to the I2BS 110 which determines the required behavior of the Base Station System 140, and programs it accordingly using dedicated interface 111.

Figure 4:
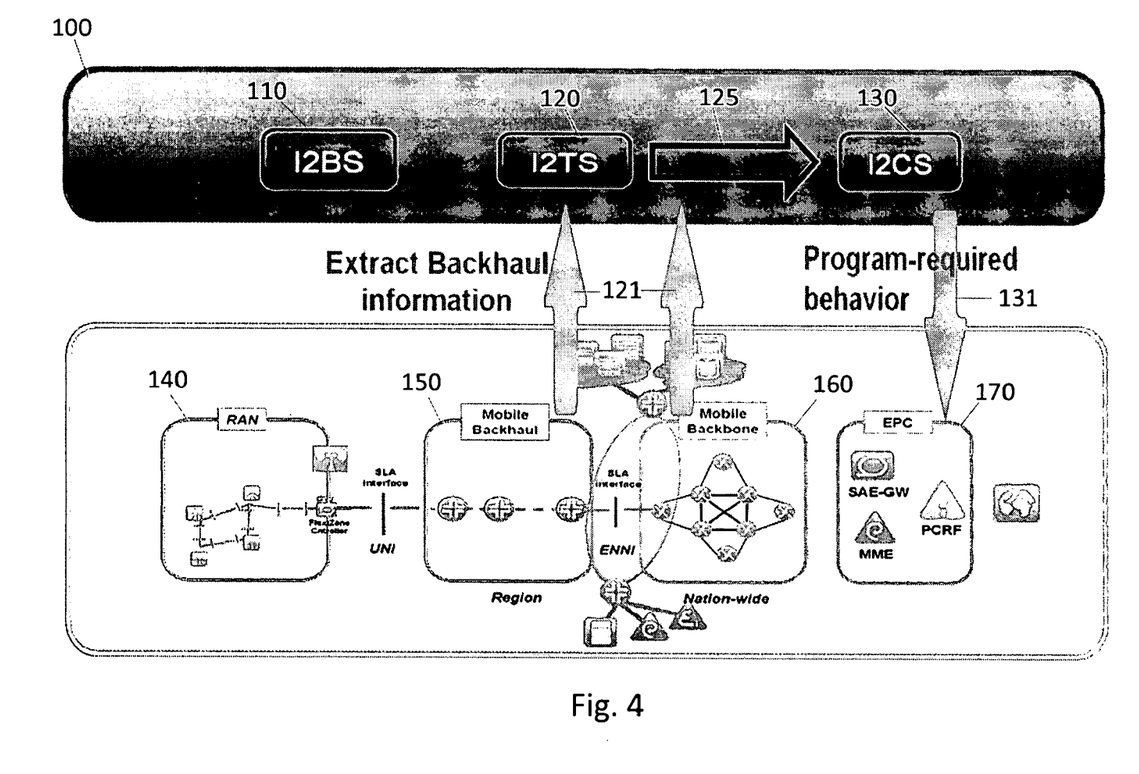
FIG. 4 illustrates a system according to an embodiment.

FIG. 4 illustrates an example in which real-time and context-related information that can be extracted by the I2TS 120 from the transport system 150, 160 via dedicated interface(s) 121. The extracted information may be transmitted to the I2CS 130 which determines the required behavior of one or more of the EPC network elements or applications 170, and programs them accordingly using dedicated interface 131.

According to certain embodiments, dedicated interface(s) 111, 121, 131 are strictly secured. For instance, this may be implemented by using Datagram Transport Layer Security (DTLS) protocol which provides communications privacy for datagram protocols, or Internet Protocol Security (IPsec).

Figure 5:
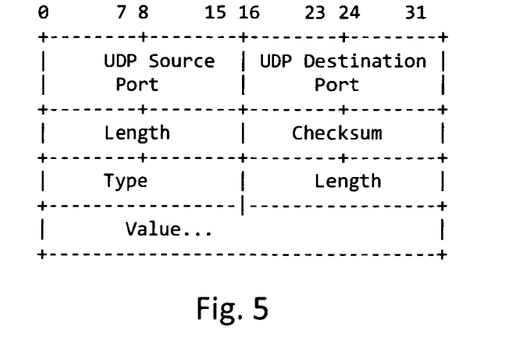
FIG. 5 illustrates an example format for a UDP payload, according to an embodiment.
Figure 6:
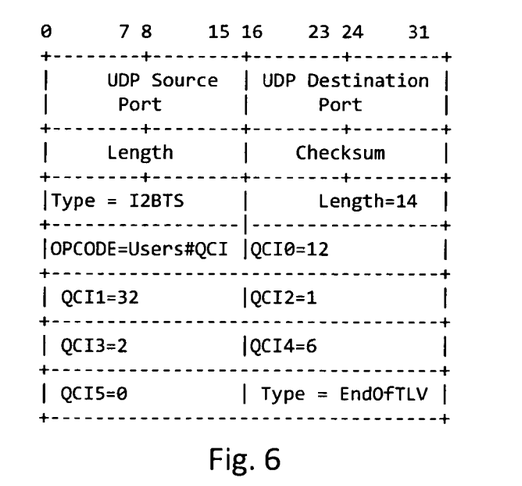
FIG. 6 illustrates an example UDP, according to one embodiment.

One embodiment may use a dedicated user datagram protocol (UDP)-based (control) protocol between the I2BS 110, I2TS 120 and I2CS 130, ensuring separation between control and data plans. FIG. 5 illustrates an example format for such a UDP-based protocol, according to an embodiment. According to one embodiment, UDP source and destination ports should be registered. FIG. 6 illustrates an example UDP payload, according to an embodiment. For example, the UDP payload may contain type length values (TLVs). Type=0 may show the end of TLVs. Type may be according to entity, for instance, I2BS, I2TS, I2CS. Each of them may define internal OPCODES with the supported application programming interfaces (APIs) including opcode for vendor specific extension.

The transport system (or a specific transport network element) may extract and feed to the RAN over this interface information about the QoS needs of "over-the-top" internet flows like Youtube®, etc. Conventionally, such traffic is treated as part of generic internet traffic and typically delivered over a UE's default bearer with no special QoS. However, the transport network element can use deep packet inspection to extract specific flow parameters (such as the duration of the flow, the average and/or peak bit-rate expected by the stream, the type of service, delay tolerance, etc.) and provide this information to the RAN over the I2BS interface. The RAN can then make use of this information for scheduling and ensuring QoS for that traffic stream differently than the general treatment of over-the-top internet traffic.

Regarding the I2CS interface, one embodiment of the use of this interface is to communicate a level of RAN congestion to the PCRF, in response to which the PCRF can modify the level of QoS it authorizes based on RAN congestion. For example, when users try to set up a HD-voice call over SIP/IMS, the CSCF will consult the PCRF to verify the authorized level of QoS for the user. When the RAN gets congested, the congestion state of the cell can be notified to the PCRF. Then, if a user tries to set up a HD-voice call, when the CSCF queries the PCRF, the PCRF can make a decision on whether to allow the HD-audio call to be negotiated (for really high-priority users), or tell the CSCF to modify the SIP negotiation of the codec to allow at most medium or even low quality audio calls (for lower priority users). This maximizes the chance of the call going through, while also allowing users to get the quality they have subscribed for.

Alternatively, the PCRF could inform the RAN of the priority of users for certain services like VoIP even before they set up a VoIP call, so that the RAN can proactively steer the users towards less loaded cells on the same frequency, or to other frequencies (inter-frequency handover), or even to Wi-Fi depending on the congestion in the RAN. Thus, if the PCRF sees that a certain type of traffic (e.g., VoIP) is spiking in a certain cell, it can notify the RAN to direct certain users who have subscribed to premium service for that type of traffic to other cells/frequencies/RATs either proactively (i.e., even prior to call setup), or during the call set up, so that the UE's call can be successfully completed in a RAN cell/frequency/RAT where adequate resources are most likely to be available.

As mentioned above, certain embodiments may utilize a UDP-based protocol. However, it is noted that other protocols, such as transmission control protocol (TCP), may be used between the systems/applications and embodiments are not limited to a UDP-based protocol. For example, in some embodiments, I2BS, I2TS and I2CS may reside on a server as Virtual Machines (VMs) and use the server's platform communication service to communicate, or they may reside on the same server as functions and use the functions' interfaces.

Figure 7:
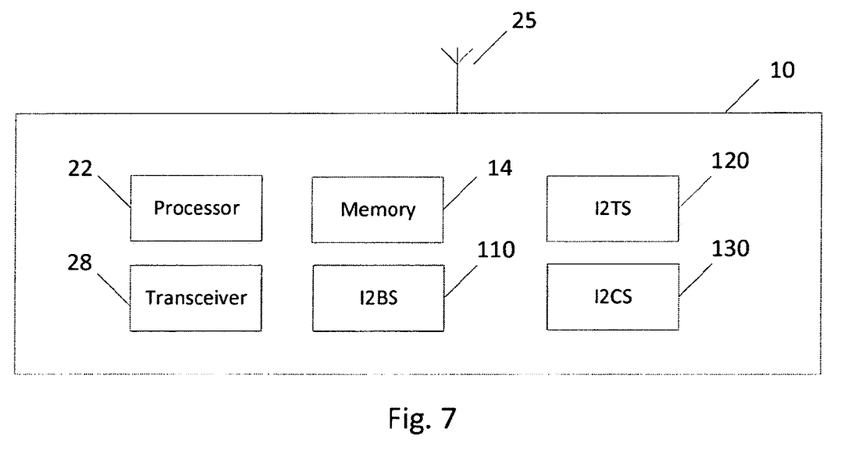
FIG. 7 illustrates a block diagram of an apparatus according to one embodiment.

FIG. 7 illustrates an example of an apparatus 10 according to an embodiment. In one embodiment, apparatus 10 may be a network entity, such as an eNB, router, switch, core network entity, etc. In this example, apparatus 10 may be considered a network management entity. For instance, apparatus 10 may be entity 100 as illustrated in FIG. 1 discussed above. Further, it should be noted that one of ordinary skill in the art would understand that apparatus 10 may include components or features not shown in FIG. 7. Only those components or features necessary for illustration of the invention are depicted in FIG. 7.

As illustrated in FIG. 7, apparatus 10 includes a processor 22 for processing information and executing instructions or operations. Processor 22 may be any type of general or specific purpose processor. While a single processor 22 is shown in FIG. 7, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network management entity. In this embodiment, apparatus 10 may include an I2BS 110, an I2TS 120, and/or an I2CS 130. According to an embodiment, I2BS 110 may be controlled by memory 14 and processor 22 to extract real-time and context related information from a RAN and to transmit the extracted real-time and context related information to the I2TS 120. The real-time and context related information extracted from the RAN may include cell utilization, number of users per quality of service (QoS) class identifier (QCI), bandwidth demand per sector and per QCI, actual location in the cell, speed of user in motion, application and context used, and/or predicted rate per application.

In an embodiment, I2TS 120 may be controlled by memory 14 and processor 22 to determine required behavior of the transport system based on the extracted real-time and context related information, and to program the transport system with the required behavior using a dedicated interface. In some embodiments, I2TS 120 may be controlled by memory 14 and processor 22 to extract real-time and context related information from the transport system via the dedicated interface, and to transmit the extracted real-time and context related information to the I2BS 110 and to an I2CS 130. According to one embodiment, the extracted real-time and context related information from the transport system may include real-time measurements of the transport network key performance indicators (KPIs), information on the transport network load, information on resource utilization in the transport network per quality of service (QoS) class identifier (QCI) and per eNB, reporting of faults and degradation events, network topology map and related costs, and/or network availability.

According to one embodiment, I2BS 110 may be controlled by memory 14 and processor 22 to determine required behavior of the radio access network based on the extracted real-time and context related information received from the interface to the transport system, and to program the radio access network with the required behavior using a dedicated interface. In an embodiment, I2CS 130 may be controlled by memory 14 and processor 22 to determine required behavior of at least one evolved packet core network element based on the extracted real-time and context related information, and to program the at least one evolved packet core network element with the required behavior. In addition, in one embodiment, I2CS 130 may be controlled by memory 14 and processor 22 to communicate a level of radio access network congestion to a policy and charging rules function (PCRF). The PCRF may be configured to modify a level of quality of service (QoS) it authorizes based on the level of radio access network congestion. In certain embodiments, I2BS 110, I2TS 120, and/or I2CS 130 can be configured to use a dedicated user datagram protocol (UDP)-based control protocol.

Figure 8:
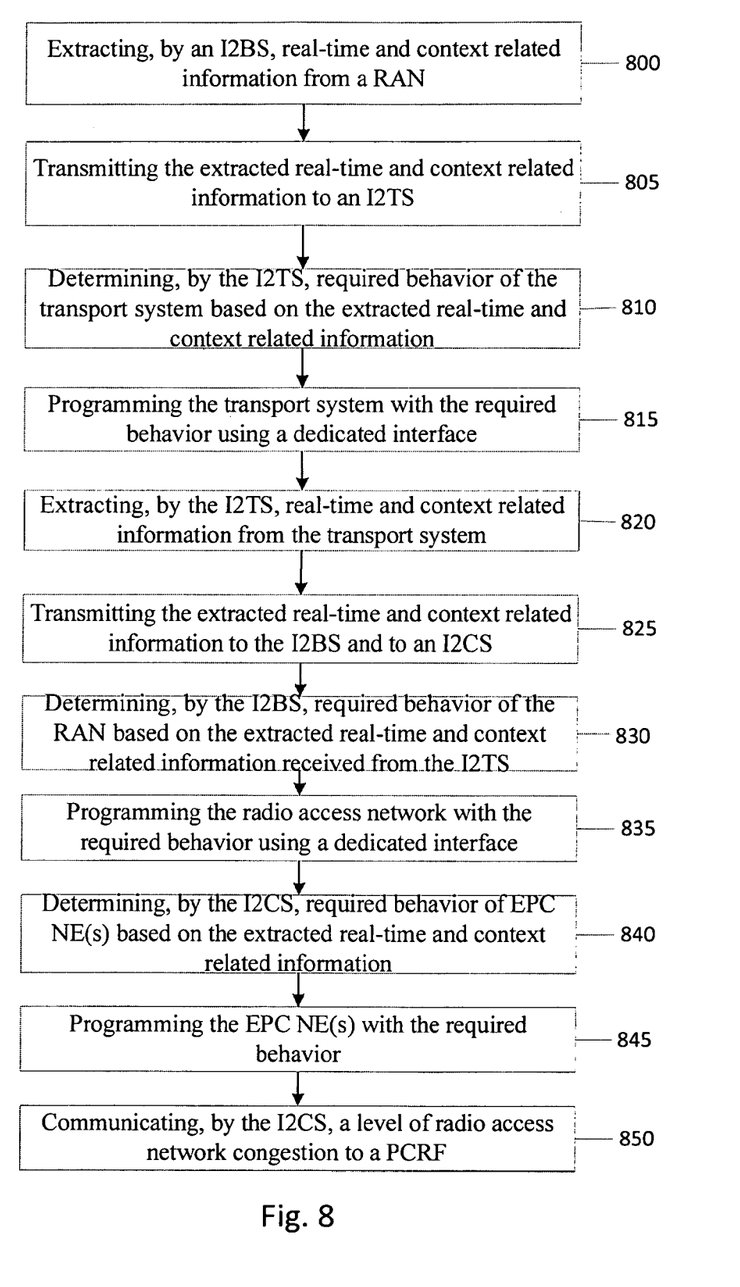
FIG. 8 illustrates an example flow diagram of a method according to one embodiment.

FIG. 8 illustrates a flow chart of a method, according to one embodiment. The method may include, at 800, extracting, by an I2BS 110, real-time and context related information from a RAN. The method may then include, at 805, transmitting the extracted real-time and context related information to an I2TS 120. The method may also include, at 810, determining, by the I2TS 120, required behavior of the transport system based on the extracted real-time and context related information, and, at 815, programming the transport system with the required behavior using a dedicated interface.

According to an embodiment, the method may further include, at 820, extracting, by the I2TS 120, real-time and context related information from the transport system via the dedicated interface, and, at 825, transmitting the extracted real-time and context related information to the I2BS 110 system and to an I2CS 130. The method can further include, at 830, determining, by the I2BS 110, required behavior of the radio access network based on the extracted real-time and context related information received from the I2TS 120, and, at 835, programming the radio access network with the required behavior using a dedicated interface.

According to certain embodiments, the method may also include, at 840, determining, by the I2CS 130, required behavior of at least one evolved packet core network element based on the extracted real-time and context related information, and, at 845, programming the at least one evolved packet core network element with the required behavior. In an embodiment, the method may include, at 850, communicating, by the I2CS 130, a level of radio access network congestion to a PCRF configured to modify a level of QoS it authorizes based on the level of radio access network congestion.

In some embodiments, the functionality of any of the methods described herein, such as those illustrated in FIG. 8 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   extracting, by an interface to a base station system, real-time and context related information from a radio access network via dedicated interface, wherein the interface to the base station system resides on top of the radio access network;
   transmitting the extracted real-time and context related information to an interface to a transport system that connects the radio access network and a core system, wherein the interface to the transport system resides on top of a transport network;
   determining, by the interface to the transport system, required behavior of the transport system based on the extracted real-time and context related information; and
   programming the transport system with the required behavior using a dedicated interface.

2. The method according to claim 1, wherein the extracted real-time and context related information comprises at least one of cell utilization, number of users per quality of service (QoS) class identifier (QCI), bandwidth demand per sector and per QCI, actual location in the cell, speed of user in motion, application and context used, or predicted rate per application.

3. The method according to claim 1, further comprising: extracting, by the interface to the transport system, real-time and context related information from the transport system via the dedicated interface; and transmitting the extracted real-time and context related information to the interface to the base station system and to an interface to the core system.

4. The method according to claim 3, wherein the extracted real-time and context related information from the transport system comprises at least one of
   real-time measurements of the transport network key performance indicators (KPIs), information on the transport network load, information on resource utilization in the transport network per quality of service (QoS) class identifier (QCI) and per eNB, reporting of faults and degradation events, network topology map and related costs, and/or network availability.

5. The method according to claim 3, further comprising: determining, by the interface to the base station system, required behavior of the radio access network based on the extracted real-time and context related information received from the interface to the transport system; and programming the radio access network with the required behavior using a dedicated interface.

6. The method according to claim 3, further comprising: determining, by the interface to the core system, required behavior of at least one evolved packet core network element based on the extracted real-time and context related information; and
   programming the at least one evolved packet core network element with the required behavior.

7. The method according to claim 6, further comprising: communicating, by the interface to the core system, a level of radio access network congestion to a policy and charging rules function (PCRF),
   wherein the PCRF is configured to modify a level of quality of service (QoS) it authorizes based on the level of radio access network congestion.

8. The method according claim 3, wherein the interface to the base station system, the interface to the transport system, and the interface to
   the core system are configured to use a dedicated user datagram protocol (UDP)-based control protocol.

9. An apparatus, comprising:
   at least one processor; and
   at least one memory comprising computer program code, and
   an interface to a base station system,
   wherein the at least one memory and the computer program code are configured, with the at least one processor, to cause the interface to the base station system at least to:
   extract real-time and context related information from a radio access network via dedicated interface, wherein the interface to the base station system resides on top of the radio access network; and
   transmit the extracted real-time and context related information to an interface to a transport system that connects the radio access network and a core system, wherein the interface to the transport system resides on top of a transport network;
   determine required behavior of the transport system based on the extracted real-time and context related information; and
   program the transport system with the required behavior using a dedicated interface.

10. The apparatus according to claim 9, wherein the extracted real-time and context related information comprises at least one of cell utilization, number of users per quality of service (QoS) class identifier (QCI), bandwidth demand per sector and per QCI, actual location in the cell, speed of user in motion, application and context used, or predicted rate per application.

11. The apparatus according to claim 9, wherein the at least
   one memory and the computer program code are configured, with the at least one processor, to cause the interface to the transport system at least to:
   extract real-time and context related information from the transport system via the dedicated interface; and
   transmit the extracted real-time and context related information to the interface to the base station system and to an interface to the core system.

12. The apparatus according to claim 11, wherein the extracted real-time and context related information from the transport system comprises at least one of real-time measurements of the transport network key performance indicators (KPIs), information on the transport network load, information on resource utilization in the transport network per quality of service (QoS) class identifier (QCI) and per eNB, reporting of faults and degradation events, network topology map and related costs, or network availability.

13. The apparatus according to claim 11, wherein the at least one memory and the computer program code are configured, with the at least one processor, to cause the interface to the base station system at least to:
  determine required behavior of the radio access network based on the extracted real-time and context related information received from the interface to the transport system; and
  program the radio access network with the required behavior using a dedicated interface.

14. The apparatus according to claim 11, wherein the at least one memory and the computer program code are configured, with the at least one processor, to cause the interface to the core system at least to:
  determine required behavior of at least one evolved packet core network element based on the extracted real-time and context related information; and
  program the at least one evolved packet core network element with the required behavior.

15. The apparatus according to claim 14, wherein the at least one memory and the computer program code are configured, with the at least one processor, to cause the interface to the core system at least to:
  communicate a level of radio access network congestion to a policy and charging rules function (PCRF),
  wherein the PCRF is configured to modify a level of quality of service (QoS) it authorizes based on the level of radio access network congestion.

16. The apparatus according to claim 11, wherein the interface to the base station system, the interface to the transport system, and the interface to the core system are configured to use a dedicated user datagram protocol (UDP)-based control protocol or a transmission control protocol (TCP).

17. The apparatus according to claim 11, wherein the interface to the base station system, the interface to the transport system, and the interface to the core system reside on a server as virtual machines (VMs) and use the server's platform communication service to communicate, or reside on the same server as functions and use the functions' interfaces.

18. A computer program, embodied on a computer readable medium, wherein the computer program is configured to control a processor to perform a process, comprising:
  extracting, by an interface to a base station system, real-time and context related information from a radio access network via dedicated interface, wherein the interface to the base station system resides on top of the radio access network; and
  transmitting the extracted real-time and context related information to an interface to a transport system that connects the radio access network and a core system, wherein the interface to the transport system resides on top of a transport network;
  determining, by the interface to the transport system, required behavior of the transport system based on the extracted real-time and context related information; and
  programming the transport system with the required behavior using a dedicated interface.

\* \* \* \* \*